United States Patent [19]

Deutschmann et al.

[11] Patent Number: 5,069,194

[45] Date of Patent: Dec. 3, 1991

[54] CONTROL OF A CHARGED, PISTON INTERNAL COMBUSTION ENGINE HAVING A PLURALITY OF EXHAUST GAS TURBOCHARGERS

[75] Inventors: Herbert Deutschmann; Hans Sudmanns, both of Friedrichshafen, Fed. Rep. of Germany

[73] Assignee: MTU Motoren-Und Turbinen-Union, Friedrichshafen, Fed. Rep. of Germany

[21] Appl. No.: 490,683

[22] PCT Filed: Jun. 23, 1989

[86] PCT No.: PCT/DE89/00416

§ 371 Date: Mar. 12, 1990

§ 102(e) Date: Mar. 12, 1990

[87] PCT Pub. No.: WO90/01112

PCT Pub. Date: Feb. 8, 1990

[30] Foreign Application Priority Data

Jul. 19, 1988 [DE] Fed. Rep. of Germany ....... 3824373
Feb. 7, 1989 [DE] Fed. Rep. of Germany ....... 3903563

[51] Int. Cl.[5] .................................................. F02P 9/00
[52] U.S. Cl. ...................................................... 123/612
[58] Field of Search ............... 123/600, 601, 602, 603, 123/611, 612

[56] References Cited

U.S. PATENT DOCUMENTS

| | | | |
|---|---|---|---|
| 3,355,877 | 12/1967 | Chaffiotte | 60/612 |
| 4,418,536 | 12/1983 | Deutschmann | 60/602 |
| 4,453,381 | 6/1984 | Dinger | 60/612 |
| 4,616,480 | 10/1986 | Deutchmann et al. | 60/612 |
| 4,753,076 | 6/1988 | Deutschman et al. | 60/612 |
| 4,930,315 | 6/1990 | Kanesaka | 60/612 |
| 5,005,359 | 4/1991 | Tashima et al. | 60/612 |

FOREIGN PATENT DOCUMENTS

| | | |
|---|---|---|
| 0034765 | 2/1981 | European Pat. Off. . |
| 407168 | 6/1922 | Fed. Rep. of Germany . |
| 2544471 | 10/1975 | Fed. Rep. of Germany . |
| 2609389 | 9/1977 | Fed. Rep. of Germany ........ 60/612 |
| 2818447 | 4/1978 | Fed. Rep. of Germany . |
| 3411408 | 3/1984 | Fed. Rep. of Germany . |
| 3607698 | 3/1986 | Fed. Rep. of Germany . |
| 3731991 | 7/1988 | Fed. Rep. of Germany . |
| 3824373 | 7/1988 | Fed. Rep. of Germany . |
| 0109728 | 8/1980 | Japan .................................... 60/612 |

OTHER PUBLICATIONS

PCT/FI88/00073, publication date: 1 Dec. '88.

Primary Examiner—Richard A. Bertsch
Assistant Examiner—Michael I. Kocharov
Attorney, Agent, or Firm—Barnes & Thornburg

[57] ABSTRACT

One of the exhaust gas turbochargers of a plurality of parallel turbochargers is constructed to be disconnectable and connectable by the arrangement of one controllable exhaust gas blocking device in the exhaust gas pipe in front of the exhaust gas turbine and one automatically operating charge air blocking device in the suction pipe of the charge air compressor. A fast power increase to the nominal power of the internal-combustion engine is achieved, if a bypass pipe with a controllable bypass blocking device is arranged at the switchable exhaust gas turbocharger, this bypass blocking device being constructed as a transverse connection between the suction pipe of the charge air compressor of the exhaust gas turbocharger, which cannot be disconnected, and the suction pipe of the charge air compressor downstream of the charge air blocking device of the disconnectable and connectable exhaust gas turbocharger. The thermal and mechanical overloading of the connected exhaust gas turbocharger is therefore avoided.

19 Claims, 6 Drawing Sheets

CONTROL OF A CHARGED, PISTON INTERNAL COMBUSTION ENGINE HAVING A PLURALITY OF EXHAUST GAS TURBOCHARGERS

BACKGROUND AND SUMMARY OF THE INVENTION

The present invention relates to a charged piston internal combustion engine having several parallel-operating exhaust gas turbochargers.

In piston internal combustion engines, exhaust gas turbochargers, for increasing the charge air pressure and the charge air volume, are shut down when the yield of exhaust gas energy is reduced in comparison to the full-load operation. This condition occurs, for example, in the partial-load and partial-speed operation of the piston internal combustion engine. In this case, when there is a low yield of exhaust gas energy, only one exhaust gas turbocharger is operated; however, when the power of the piston internal combustion engine increases, gradually one or several further exhaust gas turbochargers are connected in parallel until finally, during the full-load operation of the engine, all existing exhaust gas turbochargers will be operating.

A piston internal combustion engine of this type is disclosed by German Patent Applicaiton (DE) 34 11 408 C2. When the load of the piston internal combustion engine is low, one exhaust gas turbocharger is disconnected from the exhaust gas collector pipe by an exhaust gas blocking device controlled by the charge air pressure. In this case, a charge air blocking device in the suction pipe of the charge air compressor prevents charge air from flowing out of the charge air collector pipe and into the suction pipe. The momentarily existing charge air pressure builds up all over the compressor part of the disconnected exhaust gas turbocharger from the direction of the charge air collector pipe and leading to the charge air blocking device.

This arrangement has a disadvantage in that the requirement of a rapid and high power increase can be met only insufficiently because the piston internal combustion engine cannot follow rapid variations of a desired load requirement before the connecting operation of a previously disconnected exhaust gas turbochargers is concluded. This connection sequence of disconnected turbochargers is delayed by the fact that the charge air compressor of the disconnected exhaust gas turbocharger needs some time in order to reduce the charge air pressure, which at first still exists in its suction pipe downstream of the charge air blocking device, to the opening pressure of the charge air blocking device.

It is another disadvantage of the above-noted arrangement in that the running parts of the connected exhaust gas turbocharger are first accelerated to an overspeed which is also a result of the delayed pressure reduction in the suction pipe of the pertaining charge air compressor. The reason is that, as long as no pressure difference exists at the charge air compressor between the suction and the pressure side thereof, its power intake is low in comparison to the driving power already available at the assigned exhaust gas turbine. The equilibrium between supplied and taken in power of an exhaust gas turbocharger, at the point in time of the start of the connecting operation, takes place in an area of the characteristic diagram of the exhaust gas turbocharger which has an unacceptably high rotational speed. However, this high rotational speed results in thermal as well as mechanical stress to the running parts of the exhaust gas turbocharger reducing its durability.

The described disadvantages occur in piston internal combustion engines with single-stage as well as with dual-stage charging. The only difference is that, in the case of a single-stage charging, both problems occur at the same exhaust gas turbocharger and, in the case of a dual-stage charging, the switching delay relates to the low-pressure exhaust gas turbocharger and the overspeed problem relates to the high-pressure exhaust gas turbocharger.

It is therefore an object of the present invention to provide an arrangement for a piston internal combustion engine of the above-mentioned type which permits a fast power connecting operation to the nominal output and avoids thermal and/or mechanical overloading of the exhaust gas turbocharger to be connected.

According to the invention, this object and other objects are is achieved by the opening of a bypass blocking device at the point in time of the triggering of the connecting operation which causes an immediate pressure relief in the suction pipe of the connected charge air compressor. The conditions that are required for an optimal operation of the connected exhaust gas turbocharger are therefore obtained very rapidly on the air side at the connected exhaust gas turbocharger.

For a piston internal combustion engine of the above-mentioned type with a dual-stage charging, an advantageous further embodiment of the invention is also provided.

Principal advantages achieved by preferred embodiments of the invention include that interference with the power increase by the switching delay is eliminated when an exhaust gas turbocharger is connected; that the overspeed occurring during the connecting of an exhaust gas turbocharger is avoided; that in dual-stage charging, the acceleration of the connected low-pressure exhaust gas turbocharger is also improved; and that a simple control of the blocking device is obtained which controls the bypass pipe arranged between the suction pipes of the charge air compressor since a monitoring with respect to the closing is absent.

Other objects, advantages and novel features of the present invention will become apparent from the following detailed description of the invention when considered in conjunction with the accompanying drawings.

DETAILED DESCRIPTION OF THE DRAWINGS

Embodiments of the invention, which are shown in the drawings, will be described in detail in the following.

Figure 1:
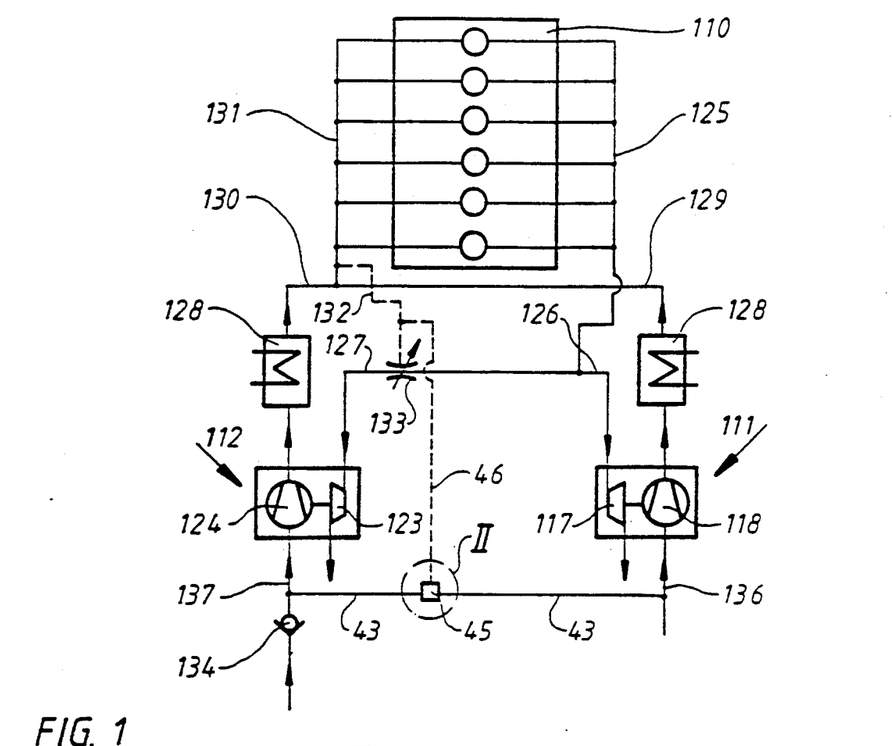
FIG. 1 is a view of a supercharging aggregate with two single-stage exhaust gas turbochargers of a piston internal combustion engine.

A charged, piston internal combustion engine 110, shown schematically according to FIG. 1, is equipped with an exhaust gas turbocharger 111 which is connected continuously on the exhaust gas and charge air side and is further connected with an exhaust gas turbocharger 112 which is constructed so that it can be switchably disconnected and connected. The continuously connected exhaust gas turbocharger 111, which provides the charge air supply of the piston internal combustion engine during idling and at low load, comprises an exhaust gas turbine 117 and a charge air compressor 118. The disconnectable or switchable exhaust gas turbocharger 112 comprises an exhaust gas turbine 123 and a charge air compressor 124.

The two exhaust gas turbochargers 111, 112 are supplied with exhaust gas from the piston internal combustion engine 110 via an exhaust gas collector pipe 125 by way of exhaust gas pipes 126, 127. The gas turbochargers 111, 112 supply their charge air by way of charge air coolers 128 and charge air pipes 129, 130 into the charge air collector pipe 131 of the piston internal combustion engine 110.

During idling and at low load of the piston internal combustion engine 110, the exhaust gas turbocharger 112 is disconnected from the exhaust gas collector pipe 125 by an exhaust gas blocking device 133 controlled by the charge air pressure in the charge air collector pipe 131 via a control line 132. In this case, a charge air blocking device 134, in the suction pipe 137, prevents charge air from flowing out of the charge air collector pipe 131 by way of the exhaust gas turbocharger 112. All over the compressor part of the disconnected exhaust gas turbocharger 112, the momentarily existing charge air pressure of the charge air collector pipe 131 builds up from the charge air collector pipe 131 to in front of the charge air blocking device 134.

A bypass pipe 43, which is controlled by a controllable bypass blocking device 45, connects the suction pipe 137 of the charge air compressor 124 of the switchable exhaust gas turbocharger 112 downstream of the charge air blocking device 134 with the suction pipe 136 of the charge air compressor 118 of the continuously connected exhaust gas turbocharger 111.

Figure 2:
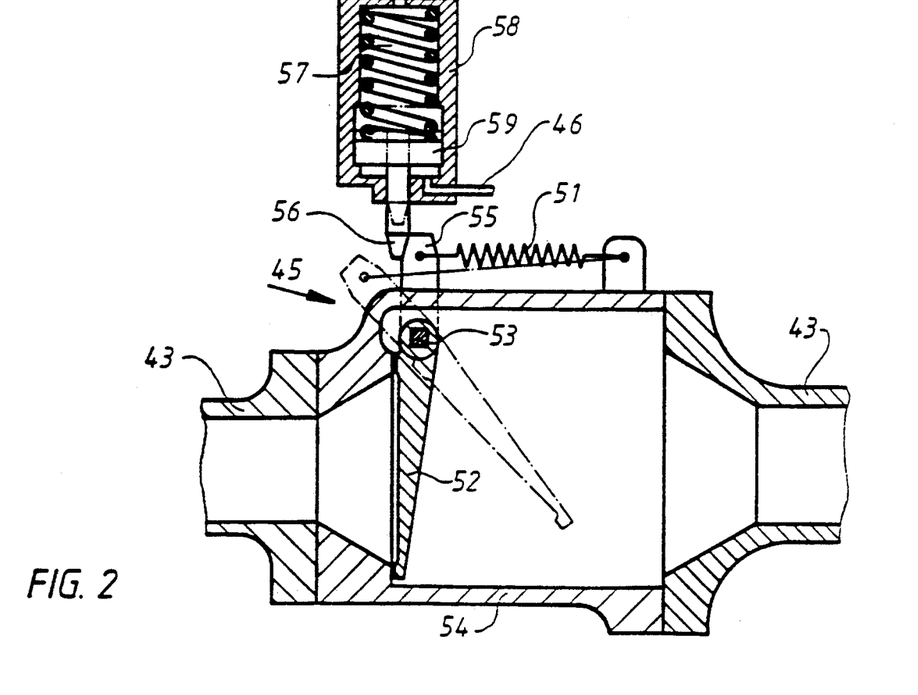
FIG. 2 is a view of a bypass blocking device with an automatically locking part according to Detail II in FIG. 1 and FIG. 3.

The bypass blocking device 45 has a locking part 52, as shown in detail in FIG. 2, which closes automatically as a result of the force of a spring 51 and is constructed as an oscillating flap which is non-rotatably connected with a rotatable shaft 53. The rotatable shaft 53, which extends to the outside through the housing 54 of the bypass blocking device 45, carries a lever 55 which is non-rotatably connected with it and to which the spring 51 is fastened. The closed position of the locking part 52, as shown in solid lines in FIG. 2, when the switchable exhaust gas turbocharger 112 is disconnected, is locked in by a remote-controllable locking bar 56 which interacts with the lever 55. The locking bar 56 forms the piston rod of a piston 59 which is guided in a housing 58 and, by a pressure spring 57, is brought into the locked position, and by a control pressure is brought into the unlocked position. The control pressure is supplied by way of the control line 46 which is connected with the control line 132 for the actuating of the exhaust gas blocking device 133.

When, during a power increase of the piston internal combustion engine 110, an upper limit of the power range of the continuously switched-on exhaust gas turbocharger 111 is reached, the exhaust gas blocking device 133 is opened under the control of the charge air pressure in the charge air collector pipe 131 by way of the control line 132. As a result, the previously switched-off exhaust gas turbocharger 112 is acted upon by exhaust gas of the piston internal combustion engine.

Simultaneously with the opening-up of the exhaust gas blocking device 133, the bypass blocking device 45 is unlocked by the pressure in the control line 46. The pressure difference which still exists at the locking part 52 at the start of the connecting operation and which is the result of the difference of the excess pressure (charge air pressure), which is still present in the suction pipe 137 of the charge air compressor 124 due to the disconnected state, and the low pressure in the suction pipe 136 of the charge air compressor 118, leads to the swinging-open of the locking part 52. As a result, an immediate pressure reduction of the excess pressure takes place in the suction pipe 137 by way of the bypass pipe 43 down to a pressure difference which is defined by a restoring force of the spring 51.

This means that, before a complete pressure compensation has taken place, the locking part 52 returns to the locking position. The suction pipes 136, 137 of the respective charge air compressors 118, 124 will therefore be disconnected again. The connected starting charge air compressor 124, while its begins to deliver, very rapidly reduces the still remaining excess pressure in the suction pipe 137 assigned to it. As a result, the charge air blocking device 134 opens up concluding the connecting operation.

Therefore, the connecting operation is concluded faster than in a case where, without the bypass pipe 43, the pressure reduction in the suction pipe 137 would have to take place only by way of the beginning charge air delivery of the connected switchable exhaust gas turbocharger 112. The power increase of the piston internal combustion engine 110 is no longer limited by the connecting operation of an exhaust gas turbocharger.

By the rapid pressure reduction in the suction pipe 137 of the connected charge air compressor 124, the unacceptable overspeed of the running parts is also avoided. The reason is that the power intake of the charge air compressor 124 will now immediately, after the triggering of the connecting operation, correspond to the power supplied by the exhaust gas turbine 123. The switchable exhaust gas turbocharger 112 will then operate at a permissible speed in the nominal range of its characteristic diagram.

Figure 3:
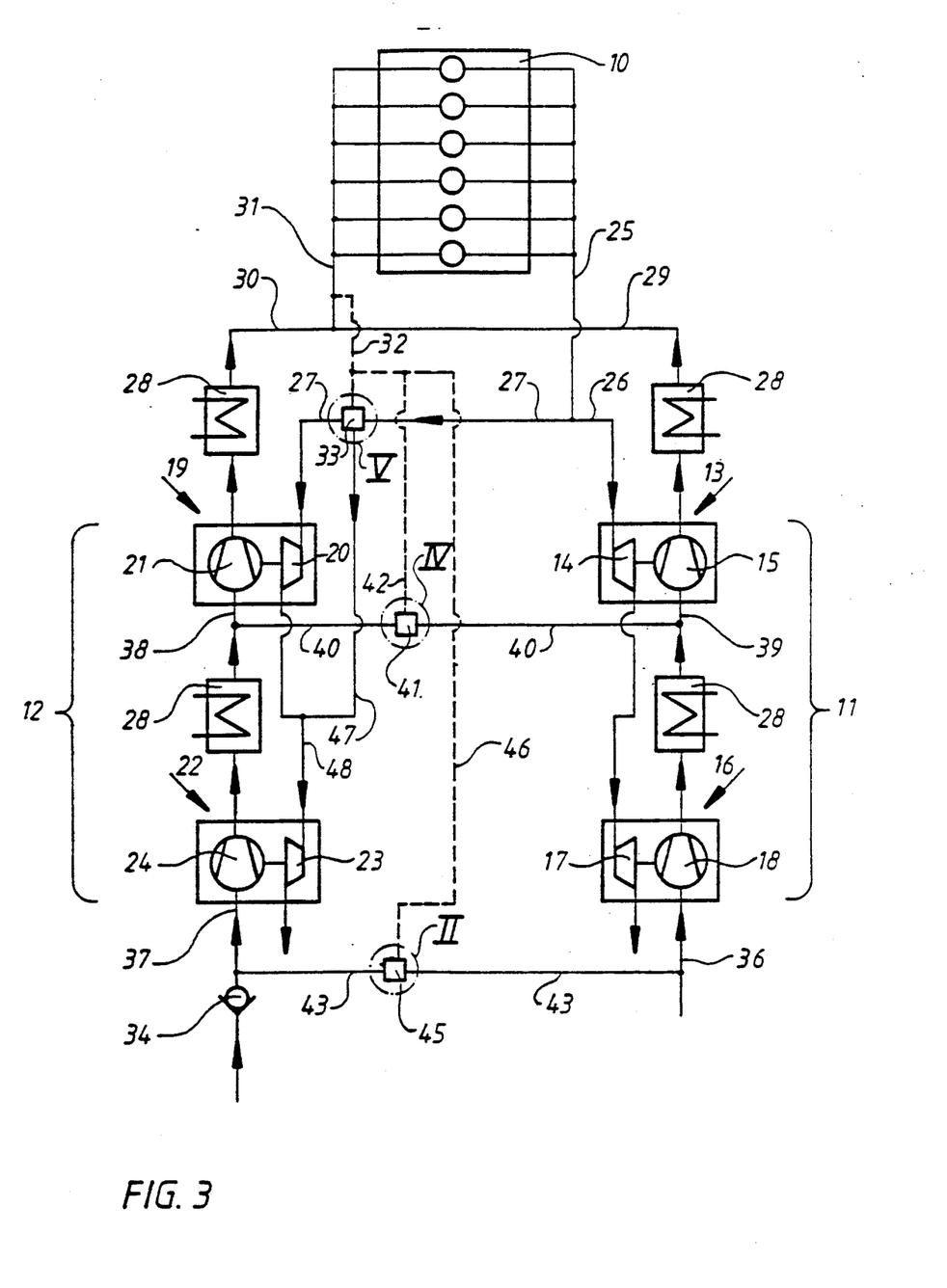
FIG. 3 is a view of a supercharging aggregate with two dual-stage exhaust gas turbochargers of a piston internal combustion engine.

FIG. 3 shows a charged, piston internal combustion engine 10 in which each exhaust gas turbocharger comprises a dual-stage exhaust gas turbocharger aggregate 11, 12 and the exhaust gas turbocharger aggregate 12 is constructed so that it can be disconnected and connected. The continuously switched-on exhaust gas turbocharger aggregate 11 comprises a high-pressure exhaust gas turbocharger 13 having a high-pressure turbine 14 and a high-pressure compressor 15 as well as a low-pressure exhaust gas turbocharger 16 having a low-pressure turbine 17 and a low-pressure compressor 18. The exhaust gas turbocharger aggregate 12, which can be switched on and off, comprises a high-pressure exhaust gas turbocharger 19 having a high-pressure turbine 20 and a high-pressure compressor 21 as well as a low-pressure exhaust gas turbocharger 22 having a low-pressure turbine 23 and a low-pressure compressor 24. The exhaust gas turbocharger aggregates 11 and 12 are supplied with exhaust gas via an exhaust gas collector pipe 25 by way of exhaust gas pipes 26 and 27. The turbocharger aggregates 11 and 12 supply their charge air into the piston internal combustion engine 10 by way of the charge air cooler 28, charge air pipes 29, 30 and by way of a charge air collector pipe 31.

As described for the piston internal combustion engine according to FIG. 1, a bypass pipe 43 is also arranged at the piston internal combustion engine 10 with dual-stage charging and is controlled by the bypass blocking device 45. However, in the case of the embodiment of the present invention as applied the piston, internal combustion engine 10 according to FIG. 3, bypass pipe 43 connects the suction pipe 37 of the low-pressure compressor 24 of the disconnectable exhaust gas turbocharger aggregate 12 downstream of a charge air blocking device 34 with the suction pipe 36 of the low-pressure compressor 18 of the exhaust gas turbocharger aggregate 11 which is continuously connected.

Another bypass pipe 40 is provided which connects the suction pipe 38 of the high-pressure compressor 21 of the disconnectable exhaust gas turbocharger aggregate 12 with the suction pipe 39 of the high-pressure compressor 15 of the exhaust gas turbocharger aggregate 11 which is continuously connected. In the additional bypass pipe 40, a by-pass blocking device 41 is arranged which, by way of a control line 42, is connected with the control line 32 for an exhaust gas blocking device 33.

Figure 4:
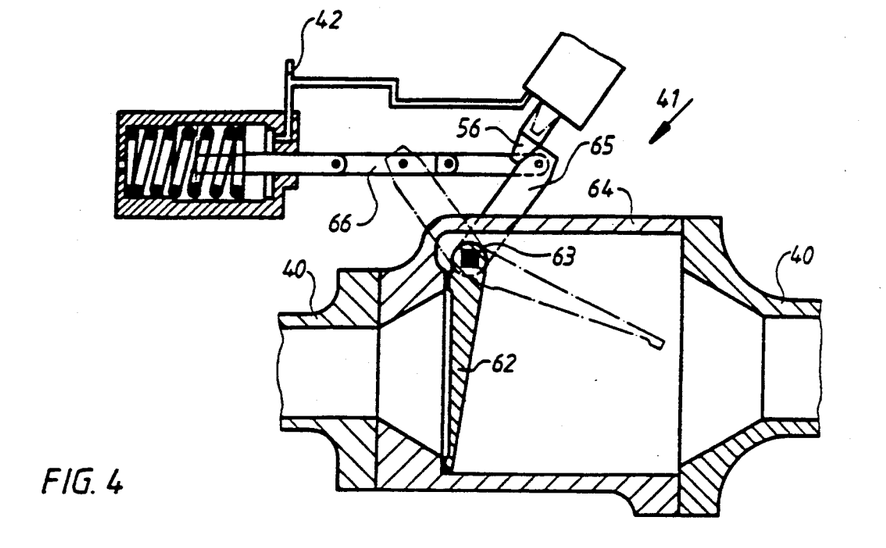
FIG. 4 is a bypass blocking device with a controlled locking part according to Detail IV in FIG. 3.

According to FIG. 4, the bypass blocking device 41, shown in FIG. 3, is equipped with a locking part 62 which is constructed as a flap and is non-rotatably connected with a rotatable shaft 63. The shaft 63, which extends to the outside through a housing 64, carries a lever 65 which is non-rotatably connected thereto and which is coupled with an adjusting mechanism 66 which is remotely controlled by way of the control line 42. The closed position of the locking part 62, shown in solid lines in FIG. 4, when the exhaust gas turbocharger aggregate 12 is switched off, is locked by a remotely controllable locking bar 56, as described for the embodiment of the present invention depicted by FIG. 3, which interacts with lever 65.

The switchable exhaust gas turbocharger aggregate 12 is also equipped with a controllable exhaust gas bypass pipe 47 which extends from the exhaust gas blocking device 33 and, while bypassing the high-pressure turbine 20 of the high-pressure exhaust gas turbocharger 19, leads into a low-pressure exhaust gas pipe 48 in front of the low-pressure turbine 23 of the low-pressure exhaust gas turbocharger 22. The exhaust gas mass flow to be branched from the high-pressure exhaust gas pipe 27 into the exhaust gas bypass pipe 47 can be determined by a corresponding dimensioning of the sectional area of flow of the exhaust gas bypass pipe 47 or by a flow control device which is not shown.

Figure 5:
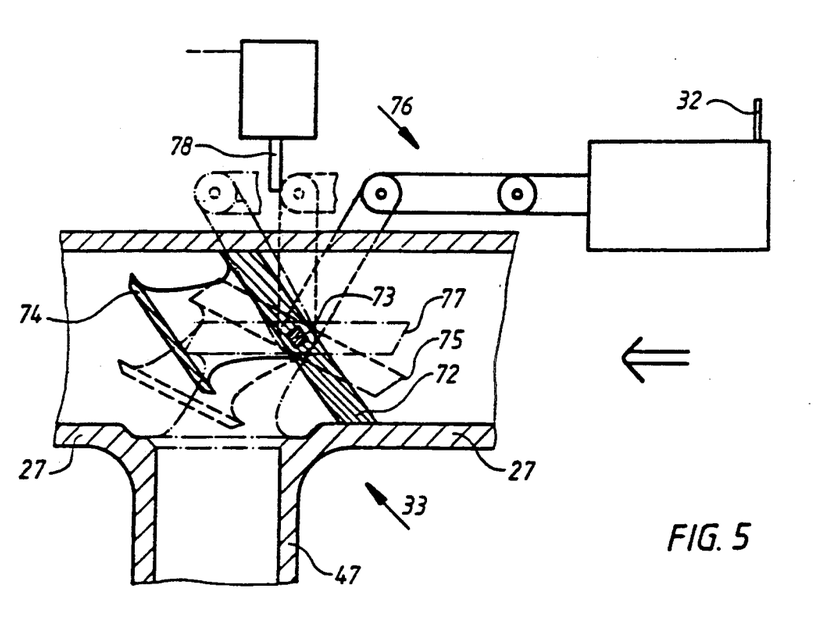
FIG. 5 is a view of an exhaust gas blocking device with the exhaust gas bypass pipe according to Detail V in FIG. 3.

The exhaust gas blocking device 33 according to the arrangement shown in FIG. 5 is equipped with a first locking part 72 for blocking the exhaust gas pipe 27 which is constructed as a rotatable disk, is non-rotatably connected with a rotatable shaft 73 and is arranged upstream of the branching-off point of the exhaust gas bypass pipe 47. A second locking part 74 of the blocking device 33 is coupled with the first locking part 72 for blocking the exhaust gas bypass pipe 47. The coupling takes place in such a manner that the actuating of the exhaust gas blocking device 33 for the opening-up of the exhaust gas pipe 27 causes a closing of the exhaust gas bypass pipe 47. An adjusting mechanism 76 for the actuating of the exhaust gas blocking device 33 has a detent position 75 (shown in broken lines) which can be released by a controllable stop 78, this detent position 75 being situated between about 10 and 60% of the complete opening of the first locking part 72. The second locking part 74 is arranged with respect to the exhaust gas pipe 27 in such a manner that, in the case of detent position 75, a flow control effect is exercised on the exhaust gas pipe 27.

As a function of an operating value of the piston internal combustion engine 10 or of the exhaust gas turbocharger aggregate 12 which affects the controllable stop 78, after the removal of the stop 78, the exhaust gas blocking device 33 is further operated from the detent position 75 to an end position 77 (shown in broken lines). When the end position 77 of the locking part 72 is reached, the connecting operation of the turbocharger aggregate 12 is completed. In this case, the exhaust gas bypass pipe 47 will then be closed by the locking part 74 and the passage in the exhaust gas pipe 27 is opened up completely.

During idling and low load of the piston internal combustion engine 10, the exhaust gas turbocharger aggregate 12 is disconnected from the exhaust gas collector pipe 25 by the exhaust gas blocking device 33 which is controlled by the charge air pressure in the charge air collector pipe 31 by way of the control line 32. In this case, the charge air blocking device 34 in the suction pipe 37 of the low-pressure compressor 24 prevents charge air from flowing out of the charge air collector pipe 31 by way of the disconnected exhaust gas turbocharger aggregate 12. All over the compressor part of the disconnected exhaust gas turbocharger aggregate 12, the momentarily existing charge air pressure builds up from the direction of the charge air collector pipe 31 to in front of the charge air blocking device 34.

When, in the case of a demand for an increasing power of the piston internal combustion engine, the upper power limit of the continuously switched-on exhaust gas turbocharger aggregate 11 is reached, the exhaust gas blocking device 33, controlled by the charge air pressure in the charge air collector pipe 31, is opened up and the previously disconnected exhaust gas turbocharger aggregate 12 is acted upon by exhaust gas of the piston internal combustion engine 10. Without any special measure, the moving parts of the high-pressure exhaust gas turbocharger 19, after the connecting operation has been triggered, would be accelerated more than the running parts of the low-pressure exhaust gas turbocharger 22 and would very rapidly reach an unacceptable rotational speed. The cause is the smaller overall size as a result of thermodynamic conditions and the resulting smaller mass moment of inertia of the high-pressure exhaust gas turbocharger 19 in comparison to the low-pressure exhaust gas turbocharger 22. Further, a delayed pressure reduction in the suction pipe 38 of the high-pressure compressor 21 has a supporting effect on the unacceptable rotational speed increase. However, the low-pressure exhaust gas turbocharger 22, after the triggering of a connecting operation, suffers a delayed acceleration because the low-pressure turbine 23 does not immediately have the required exhaust gas energy available because of the high-pressure turbine 20 connected in front of it. In order to avoid the switching delay and the unacceptable rotational speed during the connecting operation of the switchable exhaust gas turbocharger aggregate 12 comprising the high-pressure and low-pressure exhaust gas turbochargers 19, 22, three measures are simultaneously effective as discussed in detail below.

1. The opening-up of the exhaust gas blocking device 33 up to the detent position 75 causes a restriction of the cross-section of the exhaust gas pipe 27 with a simultaneous opening of the exhaust gas bypass pipe 47. Immediately after the triggering of the connecting operation of the exhaust gas turbocharger aggregate 12, a part of the exhaust gas volume flows directly into the low-pressure exhaust gas pipe 48 of the low-pressure turbine 23. The exhaust gas volume for the high-pressure turbine 20 is reduced correspondingly.

2. The unlocking of the bypass blocking device 45 in the bypass pipe 43 has the same effect on the pressure reduction in the suction pipe 37 as described above for the embodiment according to FIG. 1. The pressure reduction in the suction pipe 37 provides the prerequisites for a rapid delivery start of the low-pressure compressor 24 so that, after the connecting operation, the driving power of the low-pressure turbine 23 which is available early as a result of measure 1 discussed above, is also taken off.

3. The actuating of the bypass blocking device 41 in the bypass pipe 40 results in the pressure reduction in the suction pipe 38 of the high-pressure compressor 21 to the pressure level in the suction pipe 39 of the continuously connected high-pressure compressor 15. This also provides the prerequisite conditions for the high-pressure compressor 21 for a regular delivery start. The driving power available at the high-pressure turbine 20 can therefore also be taken off by the high-pressure compressor 21.

The connected high-pressure compressor 21 can, in addition, independently of the momentary operating condition of the assigned low-pressure compressor 24, by way of the bypass pipe 40, take in cooled air with an admission pressure matching the momentary operating point from the pipe 39 of the continuously operating exhaust gas turbocharger aggregate 11. The loading of the high-pressure exhaust gas turbocharger 19, by useful charge air delivery in connection with the initial exhaust gas volume reduced by measure 1, prevents that an undesirable overspeed of its moving parts is reached.

Via the exhaust gas bypass pipe 48, an earlier delivery start is achieved for the low-pressure exhaust gas turbocharger 22. In connection with the reduced acceleration of the high-pressure exhaust gas turbocharger 19, an approximate synchronization is achieved between the two which considerably shortens the course of a connecting operation and improves the power increase for the piston, internal combustion engine. After the connecting operation of the exhaust gas turbocharger aggregate 12 has taken place, the bypass pipe 40 may remain switched to through-flow because the same pressures exist in the connected suction pipes 38 and 39 of the exhaust gas turbocharger aggregates 11, 12 operating in parallel in the connecting operation. The locking part 62 of the bypass blocking device 41 may also be constructed in the shape of the locking part 72 in the exhaust gas blocking device 33.

Figure 6:
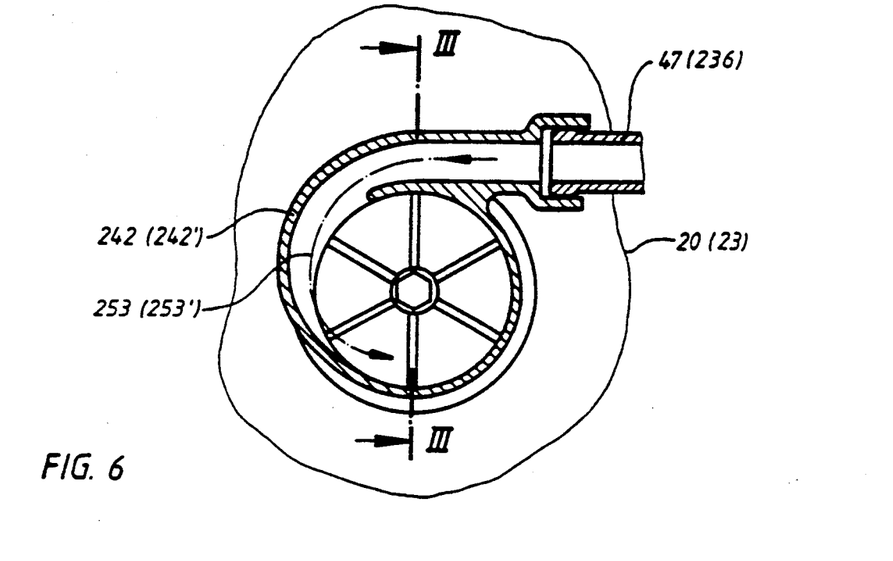
FIG. 6 is a cross-sectional view of a connecting piece of an exhaust gas turbine in the area of the exhaust gas bypass mouth according to Line II—II in FIG. 7.
Figure 7:
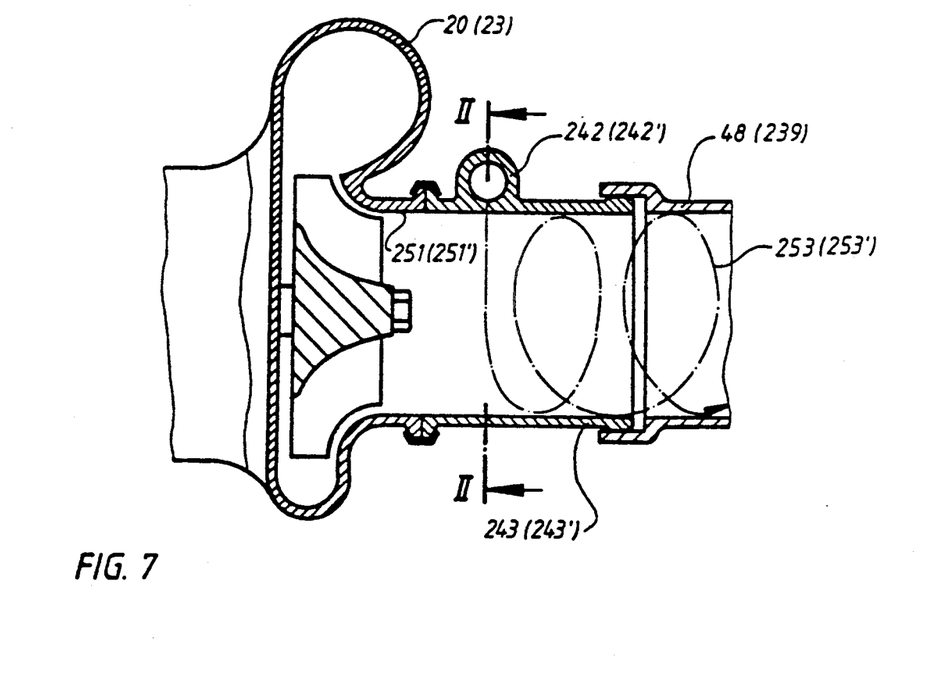
FIG. 7 is a longitudinal sectional view of an exhaust gas turbine and a connecting piece according to Line III—III in FIG. 6.

The effect of the exhaust gas mass flow supplied by way of the exhaust gas bypass pipe 47 of the low-pressure turbine 23 is also improved by the fact that the introduction into the low-pressure exhaust pipe 48 of the low-pressure turbine 23 takes place in direct vicinity of the discharge opening 251 of the high-pressure turbine 20 as shown in FIG. 3 and FIGS. 6 and 7. The mouth of the exhaust gas bypass pipe 47 into the low-pressure exhaust gas pipe 48 is constructed as a spiral housing 242, as shown in FIG. 6, so that the exhaust gas mass flow emerging from the exhaust gas bypass pipe 47 receives a swirl flow with a certain flow direction 253. The spiral housing 242 is a component of an exchangeable connecting piece 243 arranged between the high-pressure and the low-pressure turbine 20, 23. Neither the housing of the high-pressure turbine 20 nor the housing of the low-pressure turbine 23 are affected by the construction of the connection for the exhaust gas bypass pipe 47. As a result, the same exhaust gas turbochargers may be used without any changes for the switchable exhaust gas turbocharger aggregate 12 which are also used in the continuously connected exhaust gas turbocharger aggregate 11.

Figure 9:
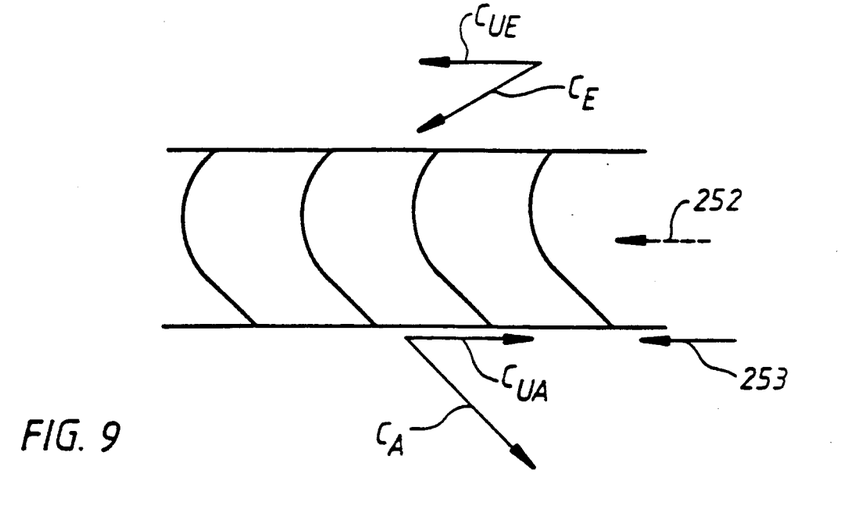
FIG. 9 is a schematic representation of the blade row of the high-pressure turbine.

Referring to FIG. 9, the angular momentum becoming effective at the turbine blade row is proportional to the difference between the circumferential component $C_{UE}$ of the turbine entry flow $C_E$ and the circumferential component $C_{UA}$ of the turbine exit flow $C_A$. For a certain time period after the triggering of a connecting operation of the exhaust gas turbocharger aggregate 12, when the turbine blade row of the high-pressure turbine 19 is still standing still or is moving at a low rotational speed, the difference between the circumferential components $C_{UE}$ and $C_{UA}$ is large. This is the result of the fact that, in the starting phase of the turbine wheel, a strong deflection of the flow takes place in the turbine blade row and the circumferential component $C_{UA}$ of the turbine exit flow $C_A$ is directed against the actual rotating direction 252 of the turbine blade row (FIG. 9). The flow direction 253 of the swirl flow, which is generated by the exhaust gas mass flow entering from the exhaust gas bypass pipe 47 into the outflow range of the high-pressure turbine 20, is directed against the circumferential component $C_{UA}$ of the turbine exit flow $C_A$ in this operating range. This results in a reduction of the circumferential flow on the turbine exit side which influences the angular momentum so that the angular momentum which is effective at the turbine blade row of the high-pressure turbine 20 is also reduced in this operating condition. The torque for the acceleration of the running parts of the high-pressure exhaust gas turbocharger 19 which is reduced in this manner prevents the occurrence of an undesirable overspeed after a connecting operation.

At the same time, an advanced charge air delivery start occurs for the low-pressure exhaust gas turbocharger 22 with the exhaust gas mass flow from the exhaust gas bypass pipe 47. In connection with the reduced acceleration of the high-pressure exhaust gas turbocharger 19, an approximate synchronization is obtained between the operation of the two superchargers which considerably decreases the course of a connecting operation and improves the power increase for the piston internal combustion engine 10.

Figure 8:
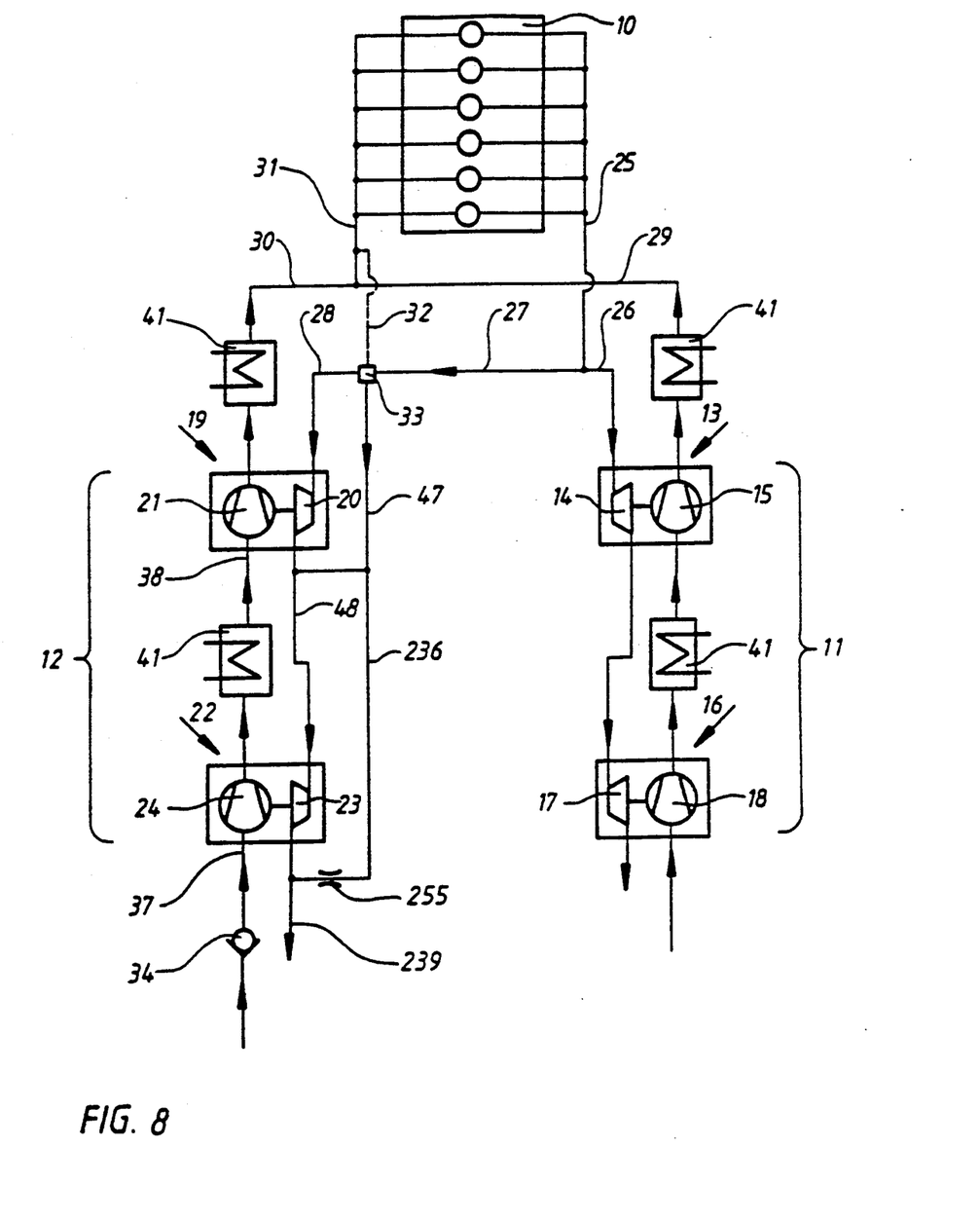
FIG. 8 is a supercharging aggregate with two dual-stage exhaust gas turbochargers of a piston internal combustion engine and two exhaust gas bypass pipes.

Another improvement of the synchronization between the high-pressure and the low-pressure exhaust gas turbocharger 19, 22, after the connecting operation and of the power increase behavior of the piston internal combustion engine 10, is achieved by an arrangement of another embodiment shown in FIG. 8. An exhaust gas bypass pipe 236 which branches off from the exhaust gas bypass pipe 47 also leads to an exhaust gas pipe 239. As seen in FIGS. 6 and 7, the mouth of the exhaust gas bypass pipe 236 leading into the exhaust gas pipe 239 is arranged in direct proximity of the outflow opening 251' of the low-pressure turbine 23 and is also constructed as a spiral housing 242' at an exchangeable connecting piece 243'. The exhaust gas mass flow can be controlled by a flow control device 255 arranged in the exhaust gas bypass pipe 236 as seen in FIG. 8.

The exhaust gas mass flow emerging from the exhaust gas bypass pipe 236 generates a swirl flow in the exhaust gas pipe 239 which is directed in such a manner that after the triggering of a connecting operation, a positive influence occurs on the power of the low-pressure turbine 23.

Figure 10:
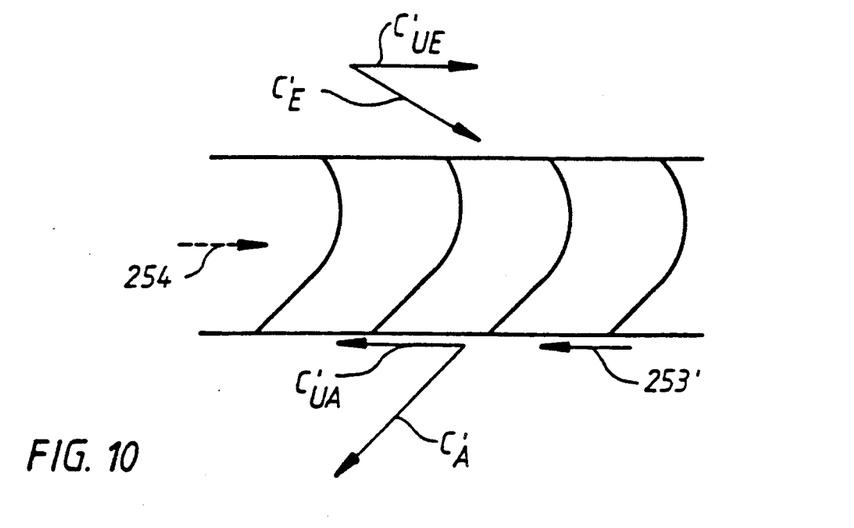
FIG. 10 is a schematic representation of the blade row of the low-pressure turbine.

As shown in FIG. 10, it also applies to the situation at the low-pressure turbine, that the angular momentum becoming effective at the turbine blade row is proportional to the difference between the circumferential component $C_{UE}'$ of the turbine entry flow $C_E'$ and the circumferential component $C_{UA}'$ of the turbine exit flow $C_A'$.

FIG. 10 shows the flow conditions at the turbine blade row of the low-pressure turbine 23 after a connecting operation while the running parts of the low-pressure exhaust gas turbocharger 22 are still standing still or are moving at a low rotational speed. The flow direction 253' of the swirl flow, which is generated by the exhaust gas mass flow entering from the exhaust gas bypass pipe 236 into the outflow area of the low-pressure turbine 23, in this operating range, has the same direction as the circumferential component $C_{UA}'$ of the turbine exit flow $C_A'$. The result is an increase of the circumferential flow on the turbine exit side affecting the angular momentum, so that the angular momentum which is in effect at the turbine blade row of the low-pressure turbine 23 also increases in the direction of the actual rotating direction 254.

The torque increase at the low-pressure turbine 23, which can be achieved by the additional exhaust gas bypass pipe 236, in connection with the partial exhaust gas volume supplied by way of the exhaust gas bypass pipe 47 of the low-pressure turbine 23, causes a fast acceleration of the running parts of the low-pressure exhaust gas turbocharger 22 after a connecting operation. As a result, the power excess is increased which is required for a fast delivery start of the low-pressure compressor 24 after a connecting operation.

The combination of the power intake of the high-pressure exhaust gas turbocharger 19 which is reduced for a short time after a connecting operation with the simultaneously increased power intake of the low-pressure exhaust gas turbocharger 22 and the other measures avoids a noticeable switching delay for the exhaust gas turbocharger aggregate 12. At the same time, the occurrence of an overspeed is prevented at the high-pressure exhaust gas turbocharger.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. A control arrangement for a charged, piston internal combustion engine having a plurality of exhaust gas turbochargers including at least one switchable exhaust gas turbocharger which is selectively operated and a continuously connected exhaust gas turbocharger operating in parallel therewith, each of the plurality of exhaust gas turbochargers having an exhaust gas turbine connected to an exhaust gas pipe and a charge air compressor connected to a suction pipe, the arrangement comprising:

a controllable exhaust gas blocking device for blocking passage of exhaust gas to the exhaust gas turbine of the at least one switchable exhaust gas turbocharger;

an automatically operating charge air blocking device for blocking the suction pipe of the charge air compressor of the at least one switchable gas turbocharger;

a bypass pipe connecting the suction pipe of the charge air compressor of the at least one switchable gas turbocharger, at a point upstream from the automatically operating charge air blocking device, with the suction pipe of the charge air compressor of the continuously connected exhaust gas turbocharger at a point upstream of the automatically operating charge air blocking device; and a bypass blocking device for controllably blocking the bypass pipe.

2. A control arrangement for a charged, piston internal combustion engine acording to claim 1, wherein the bypass blocking device has a locking part which locks automatically in a direction towards the suction pipe of the charge air compressor of the at least one switchable exhaust gas turbocharger.

3. A control arrangement for a charged, piston internal combustion engine according to claim 2, wherein the locking part interacts with a locking device arranged in the bypass blocking device for locking the locking part at a closed position.

4. A control arrangement for a charged, piston internal combustion engine according to claim 3, wherein the locking device is remotely controlled by a control line connected with a control line for operating the controllable exhaust gas blocking device.

5. A control arrangement for a charged, piston internal combustion engine having a plurality of exhaust gas turbochargers including at least one switchable exhaust gas turbocharger which is selectively operated and a continuously connected exhaust gas turbocharger operating in parallel therewith, each of the exhaust gas turbochargers comprise a high-pressure exhaust gas turbocharger having a high-pressure turbine connected to an exhaust gas pipe and a high-pressure compressor connected to a suction pipe, and a low-pressure exhaust gas turbocharger having a low-pressure turbine connected to an exhaust gas pipe and a low-pressure compressor connected to a suction pipe, the arrangement comprising:

a controllable exhaust gas blocking device for blocking passage of exhaust gas to the at least one switchable exhaust gas turbocharger;

an automatically operating charge air blocking device for blocking passage of suction gas to the at least one switchable gas turbocharger;

a bypass pipe connecting the suction pipe of the low-pressure compressor of the continuously connected exhaust gas turbocharger to the suction pipe of the low-pressure compressor of the switchable exhaust gas turbocharger down stream of the automatically operating, charge air blocking device; and a bypass blocking device for controllably blocking the bypass pipe.

6. A control arrangement for a charged, piston internal combustion engine acording to claim 5, wherein the bypass blocking device has a locking part which locks automatically in a direction towards the suction pipe of the compressor of the at least one switchable exhaust gas turbocharger.

7. A control arrangement for a charged, piston internal combustion engine according to claim 6, wherein the locking part interacts with a locking device arranged at the bypass blocking device for locking the locking part in a closed position.

8. A control arrangement for a charged, piston internal combustion engine according to claim 6, wherein the locking device is remotely controlled by a control line connected with a control line for operating the controllable exhaust gas blocking device.

9. A control arrangement for a charged, piston internal combustion engine according to claim 5, further comprising an additional bypass pipe connecting a suction pipe of the high-pressure compressor of the continuously connected exhaust gas turbocharger, and a suction pipe of the high-pressure compressor of the switchable exhaust gas turbocharger.

10. A control arrangement for a charged, piston internal combustion engine according to claim 9, wherein a locking part of a bypass blocking device in the additional bypass pipe can be remotely controlled by a control line connected with the control line for operating the controllable exhaust gas blocking device.

11. A control arrangement for a charged, piston internal combustion engine according to claim 5, wherein an exhaust gas bypass pipe leads from the controllable exhaust gas blocking device into a low-pressure exhaust gas pipe which feeds the low-pressure turbine of the low-pressure exhaust gas turbocharger of the switchable exhaust gas turbocharger.

12. A control arrangement for a charged, piston internal combustion engine according to claim 11, wherein the controllable exhaust gas blocking device includes a first locking part for an exhaust gas pipe leading from the engine and a second locking part coupled to the first locking part, for the exhaust gas bypass pipe whereby an opening of the first locking part causes a closing of the second locking part.

13. A control arrangement for a charged, piston internal combustion engine according to claim 12, wherein the exhaust gas blocking device has a detent position which is in effect between about 10 to 60% of a full opening of the first locking part and wherein the position of the second locking part influences a cross-section of the exhaust gas pipe.

14. A control arrangement for a charged, piston internal combustion engine according to claim 11, wherein a mouth of the exhaust gas bypass pipe is arranged in direct proximity of an outflow opening of the high-pressure turbine of the switchable turbocharger and wherein exhaust gas mass flow emerging from the exhaust gas bypass pipe generates a swirl flow in the low-pressure exhaust gas pipe of the switchable turbocharger, a flow direction of this swirl flow being directed against an exit swirl of the high-pressure turbine of the switchable turbocharger occurring after a connecting operation during a starting of the high-pressure exhaust gas turbocharger of the switchable turbocharger.

15. A control arrangement for a charged, piston internal combustion engine according to claim 14, wherein an additional exhaust gas bypass pipe branches off the exhaust gas bypass pipe, a mouth of the additional exhaust gas bypass pipe being arranged in direct proximity of an outflow opening of the low-pressure turbine of the switchable turbocharger in an exhaust gas pipe thereof.

16. A control arrangement for a charged, piston internal combustion engine according to claim 15, wherein the exhaust gas mass flow emerging from the exhaust gas bypass pipe generates a swirl flow in the exhaust gas pipe of the low-pressure turbine of the switchable turbocharger, the flow direction of this swirl flow being the same as that of an exit swirl of the low-pressure turbine of the switchable turbocharger occurring during the starting of the low-pressure exhaust gas turbocharger of the switchable turbocharger after a connecting operation.

17. A control arrangement for a charged, piston internal combustion engine according to claim 15, wherein the mouth of exhaust gas bypass pipe and of exhaust gas bypass pipe are constructed as a spiral housing.

18. A control arrangement for a charged, piston internal combustion engine according to claim 17, wherein the connection of the exhaust gas bypass pipe and of the exhaust gas bypass pipe is an exchangeable connecting piece.

19. A control arrangement for a charged, piston internal combustion engine according to claim 15, wherein a flow control device which influences a mass throughput is arranged in the exhaust gas bypass pipe.

* * * * *